United States Patent [19]

Rappaport et al.

[11] Patent Number: 5,451,839

[45] Date of Patent: Sep. 19, 1995

[54] PORTABLE REAL TIME CELLULAR TELEPHONE AND PAGER NETWORK SYSTEM MONITOR

[76] Inventors: Theodore S. Rappaport, 1410 Gladwood Dr., Blacksburg, Va. 24062; Joseph G. Liberti, 12103 Garyhill Dr., Fairfax, Va. 22030; Scott L. McCulley, 1200 Huntclub Rd.; Michael D. Keitz, 705½ Progress St., both of Blacksburg, Va. 24060

[21] Appl. No.: 3,413

[22] Filed: Jan. 12, 1993

[51] Int. Cl.$^6$ .................. H04B 3/46; H04B 17/00; H04Q 1/20

[52] U.S. Cl. ........................ 375/224; 375/98; 375/121; 379/59; 379/63; 455/67.1; 455/226.2; 455/226.4; 340/825.1; 340/825.17

[58] Field of Search ............... 375/7, 10, 121, 98; 455/67.1, 67.3, 67.7, 226.1, 226.2, 226.3, 226.4; 379/59, 63; 340/825.1, 825.7

[56] References Cited

U.S. PATENT DOCUMENTS

| | | | |
|---|---|---|---|
| 4,563,680 | 1/1986 | Nakajima | 340/825.44 |
| 4,612,415 | 9/1986 | Zdunek et al. | 379/57 X |
| 4,646,320 | 2/1987 | Krishnan | 375/10 |
| 4,700,374 | 10/1987 | Bini | 379/60 |
| 4,823,123 | 4/1989 | Simak | 340/825.44 |
| 4,868,885 | 9/1989 | Perry | 455/226.2 |
| 4,918,623 | 4/1990 | Lockitt et al. | 375/10 |
| 4,964,065 | 10/1990 | Hicks et al. | 455/67.7 |
| 5,072,444 | 12/1991 | Breeden et al. | 370/94.1 |
| 5,121,342 | 6/1992 | Szymborski et al. | 375/10 |
| 5,122,795 | 6/1992 | Cubley et al. | 340/825.44 |
| 5,136,719 | 8/1992 | Gaskill et al. | 455/193.1 |
| 5,144,642 | 9/1992 | Weinberg et al. | 375/10 |
| 5,218,629 | 6/1993 | Dumond, Jr. et al. | 379/59 |
| 5,230,087 | 7/1993 | Meyer et al. | 455/67.1 |
| 5,276,728 | 1/1994 | Pagliarali et al. | 379/59 X |
| 5,289,526 | 2/1994 | Chymyck et al. | 379/59 |
| 5,333,177 | 7/1994 | Braitberg et al. | 379/59 |

OTHER PUBLICATIONS

"Nokia"; Nokia's Network Measurement System; Not Dated.

"SAFCO", Performance Analysis System; Copyright 1992, SAFCO Corporation Not Dated.

"SAFCO" Product Line Overview; Copyright 1991; SAFCO Corporation; Not Dated.

Realtime Analysis of System Performance; CellSpan;

(List continued on next page.)

*Primary Examiner*—Stephen Chin
*Assistant Examiner*—Amanda T. Le
*Attorney, Agent, or Firm*—Whitham, Curtis, Whitham & McGinn

[57] ABSTRACT

A portable real-time monitoring system for field testing and troubleshooting a cellular telephone network, paging network, or mobile radio system employs a user friendly interface between a user and a scanning radio receiver which displays, monitors and stores parameters related to real-time performance. A portable all-band radio receiver capable of receiving cellular and paging frequencies is connected to a computer, such as, for example, a lap-top computer suitable for mobile operation at remote sites, personal computer (PC) or workstation. An interface circuit is installed within the radio receiver which taps available signals within the receiver as well as allows the computer to control the receiver frequency selection, band designation and demodulation setting. The interface hardware and microcode cooperate to process and decode received signals according to cellular and paging network industry standards. An application running on the computer is provided which utilizes the processed signals to permit complete automated reception, display and storage of cellular, paging, and mobile radio data as well as the signal strength (RSSI) for each signal. All monitored activity is displayed on the PC screen and is written to a disk in an organized ASCII or HEX file for instant retrieval and analysis. Masks can also be specified by the user which allow only selected data to pass or not pass through the system. The masks may be used to trigger alarms and print data when selected data is detected.

15 Claims, 12 Drawing Sheets

OTHER PUBLICATIONS

LCC Incorporated "Let Call Quality Be Your Competitive Edge"; Not Dated.

RSAT; Realtime System Analysis Tool; "A Complete Picture of System Performance—In Real Time"; LCC Incorporated; Not Dated.

"Analyzing channel behaviour in digital mobile radio networks using channel impulse response"; pp. 2-5; Not Dated.

NES Series 500; Comarco Advanced Technologies Division; Anaheim, California Not Dated.

Cellular Measurement Analysis Test Equipment & Post Collection Analysis Software; CelluMate; Not Dated.

RSAT-2000 Cellular field measurement tools for the future; LCC Incorporated; Arlington, Va.; Not Dated.

NovAtel Cellular Systems Engineering; NovAtel; Not Dated.

CelluMate CM1000; LCC Incorporated; "Cellular Measurement and Analysis Test Equipment and Post Collection Analysis Software"; Product Release; Feb. 4, 1990.

FIG. 8

| Statistics | Rollow Call | Channel | Monitor | Grid | Options | | Exit |

Status

Channel: 352  RSSI: −109 dBm
Mode: FCC  THold: −125 dBm
Bank: B  RSSI Int: 5 sec
Home 352  Dsk Free: 13 MB
SID: 502 REGR: 0 EXT: 1
DTX: 0 CPA: 1 DCC: 1 SER: 1
Mask MIN: *(011) ???−???? Time: 20:20
Operation: Channel Monitor
FCC Buffer A: 0  B: 0

Grid: OHARE.MTX

| | | | |
|---|---|---|---|
| A <334> | 355 | 376 | 397 | 418 | 439 |
| B <335> | 356 | 377 | 398 | 419 | 440 |
| C <336> | 357 | 378 | 399 | 420 | 441 |
| D <337> | 358 | 379 | 400 | 421 | 442 |
| E <338> | 359* | 380 | 401* | 422 | 443* |
| F <339> | 360 | 381 | 402 | 423 | 444 |
| G <340> | 361 | 382 | 403 | 424 | 445 |
| H <341> | 362 | 383 | 404 | 425 | 446 |
| I <342> | 363 | 384 | 405 | 426 | 447 |
| J <343> | 364 | 385 | 406 | 427 | 448 |
| K <344> | 365 | 386 | 407 | 428 | 449 |
| L <345> | 366 | 387 | 408 | 429 | 450 |
| M <346> | 367 | 388 | 409 | 430 | 451 |
| N <347> | 368 | 389 | 410 | 431 | 452 |
| O <348> | 369 | 390 | 411 | 432 | 453 |
| P <349> | 370 | 391 | 412 | 433 | 454 |
| Q <350> | 371 | 392 | 413 | 434 | 455 |
| R <351> | <372> | 393 | 414 | 435 | 456 |
| S <352> | <373> | 394 | 415 | 436 | 457 |
| T <353> | 374 | 395 | 416 | 437 | 458 |
| U <354> | 375 | 396 | 417 | 438 | 459 |

Messages: OHARE352.LOG (703) 230−2333
  Following Channel Assignment
  Assigned to channel 653
  VMAC: 0 SAT: 0
653 Min:−116, Avg:−112, Max:−106
(703) 230−2333  Page−NoPrv,NoAuth,0
  ESN: $82−296B43
  Orig 14: Class 3, Disc, 25 MHz
  Called Addr: 0114455551212
−Writing hex data to disk−

CELLSCOPE 2000 (TM)  c.1992 TSR Technologies, Inc.

F1:Help  F2:A/B  F3:F/R  F4:Last  F5:Home  Alt−F5:Set  F6:Log  F8:Spkr  F9:SYS

FIG. 10

| Span | Record | Key page | Options | Exit |
|---|---|---|---|---|

Log File: PAGETRAC.LOG

| Lower limit | 152.4800 MHz |
|---|---|
| Upper limit | 981.1375 MHz |
| Increment | 1.0000 kHz |
| Dwell time | 200.0 ms |
| Wait time | 5.0 sec |
| tHreshold | −80 dBm |
| Num. cycles: | INF |
| Start time: | 19.00 |
| sTop time: | 23.00 |
| eXclude bands | ▲ |
| lOg file: | PAGETRAC.LOG |
| scAn file: | SANFRAN.SCN |
| pRint scan file | |
| Go | |
| Frequency table | ▲ |
| Custom scan | ▲ |
| Exit menu | |

```
0  00916380 P512   Numer -24
0                  Alpha -f
0  00935180 P512   Numer 4102879760-804--804
0                  Alpha f@'Kg # ff1
0  07006563 Golay  Numer 10200000000074816888
0                  Alpha !(       ~AAA(JJJ
0  06369530 P512   Numer 28 20 21 14
0                  Alpha fA fA£1f
0  09633790 P512   Numer 8474101847474101
0                  Alpha H£ffH£ff
0  06929920 P512   Numer 5280431
0                  Alpha %fPtL
0  09680850 P512   Alpha effL
0  09006643 P512   Numer 666-7455
0                  Alpha f, f*E
1  09011653 P512   Numer 6386208888888891111
                   Alpha 6Pt@ff Df f
1  09200003 P512   Numer 3334
                   Alpha 3f
```

| Start time: | 19:00 | 20:31 |
|---|---|---|
| End time: | 23:00 | 20:31 |

PAGETRACKER 2000 (TM)  c.1992 TSR Technologies, Inc.

Custom scanning of discrete frequencies

PORTABLE REAL TIME CELLULAR TELEPHONE AND PAGER NETWORK SYSTEM MONITOR

BACKGROUND OF THE INVENTION

1. Field of the Invention

The invention generally relates to system for monitoring cellular telephone and paging networks and, more particularly, to a portable monitoring system useful for field testing and monitoring network usage and performance parameters in real-time.

2. Description of the Prior Art

A cellular communication system essentially consists of a plurality of cell sites, or base stations, well positioned throughout a geographical region, a Mobile Telephone Switching Office (MTSO), and a plurality of mobile units. Each cell site has a high power antenna system coupled to a control channel transmitter and a control channel receiver, which utilize a plurality of FM duplex channels each comprised of a forward voice channel (FVC) and a reverse voice channel (RVC). The mobile telephone switching office (MTSO) acts as a central coordinating site for the entire cellular network. Each cell in the network connects to the MTSO which, in turn, is connected to a conventional land telephone network.

When a subscriber initiates a call from a mobile unit, a call initiation request is placed on a reverse control channel (RCC). The mobile unit transmits its Mobile Identification Number (MIN), Electronic Serial Number (ESN), and Station Class Mark (SCM), along with the destination telephone number. If a cell cite successfully receives this information, it is forwarded to the MTSO, which may check to see if the subscriber is registered or not, and then assigns the call to a forward and reverse voice channel pair (FVC and RVC) of a public switched telephone line and the conversation commences.

When a subscriber receives a call, the incoming call is received by the MTSO which directs each cell site to transmit on its forward control channel (FCC) a paging message containing the subscriber's mobile identification number (MIN). Each mobile unit constantly monitors the FCC and when its MIN is successfully detected, the mobile unit transmits an acknowledgement signal on the reverse control channel (RCC). Upon a particular cell site receiving the acknowledgement signal, the MTSO directs that site to simultaneously issue a forward voice channel (FVC) and a reverse voice channel (RVC) pair. In this manner, the conversation is carried out on a dedicated channel pair separate from the control channels.

Throughout a typical conversation, as the mobile unit travels throughout the service area, the MTSO coordinates and issues numerous "handoffs" which automatically switch subscribers to different voice channels at different cell sites throughout a service area. Handoff decisions are made by the MTSO when the signal strength on the RVC falls below a predetermined radio signal strength indicator (RSSI) threshold level. Threshold levels are periodically adjusted by the service provider according to such factors as, market growth, system growth, call traffic patterns, and interference.

If a new call for a mobile unit comes in and all of the voice channels of the particular cell site receiving the acknowledgement signal are occupied, then the MTSO directs the cell site to issue a directed retry to the subscriber which directs the subscriber to switch to a different control channel on another cell. Depending on the radio propagation effects and the specific location of the mobile unit, this procedure may or may not result in a successful call. Sometimes the MTSO does not issue a redirect to the subscriber, but rather mistakenly switches the call to an already occupied voice channel. In this instance, a collision occurs generally resulting in both calls being dropped. Other factors, including the performance of the MTSO, the specific channel assignments made, the relative number and location of the cell sites, and the set signal threshold levels may contribute to degrade cellular service resulting in dropped or incompleted calls.

In order to monitor a cellular network's performance, detect fraudulent users, and troubleshoot problems, a service provider must be able to monitor the various control and voice channels. Prior art methods involve hard-wired monitor devices on the MTSO; however, such methods are incapable of monitoring real-time signals or signal strength data at various locations throughout a service area. Often, if a problem is suspected on a particular channel, a field technician is sent into the field with test equipment dedicated to that particular channel. This is inefficient since individual pieces of dedicated test equipment lacks the ability to monitor all channels as well as follow calls from channel to channel as the MTSO routs the call through the system.

In addition to cellular voice technology, mobile paging has come into wide spread use wherein a subscriber carries a portable pager unit on their person which alerts them to an incoming page message. Each page message is sent to a particular paging receiver, which is assigned a unique pager ID, or "cap-code". The capcode is a seven digit decimal number that identifies a particular pager unit.

A mobile paging system relies on well positioned base station throughout a geographical region. These base stations generally have tall towers which support one or more transmitting antennas typically radiating hundreds of watts of power. A wide-area paging system generally handles messages from many sources. Some paging traffic may originate from the same geographical location as the paging transmitter, while other traffic may be brought to the transmitter via landline, or satellite and microwave links from other geographic areas. Since it is generally the case that the location of a particular user is unknown, most paging systems rely on redundant broadcast of a particular page. In this type of system, the user's page is "sprayed" simultaneously from many different base stations in many different cities so that a user can receive a page wherever they are.

Different paging systems throughout the world, such as, for example POCSAG, GOLAY, and NEC, use several methods to activate a particular pager. For example, some pagers may just beep a certain number of times, others may beep and then display an alphanumeric message. The way a pager responds to a page is determined by a "function code", which is a single decimal digit sent by the paging transmitter. The function code ranges between 0 and 3 for POCSAG and ranges between 1 and 4 for GOLAY. NEC does not specify a function code. Each paging transmission broadcasts one or more pager addresses followed by message block for some or all of the addresses. It is possible for a pager to be paged without any message block. In this case the pager simply beeps with the number of beeps being related to the function code sent by the transmitter.

As paging services proliferate throughout the world, designing more spectrum efficient systems will become paramount. The ability to measure all of the signals in adjacent frequency bands at remote cites throughout a region will become increasingly important to insure acceptable signal-to-noise and interference ratios to design systems which work well in crowded bands.

In addition, many radio systems use genetic analog, digital or subaudible tone signals for control, truncking, and user identification. These generic systems are used, for example, in public, private and military applications. For the proper design of such systems, it is necessary to measure the radiating interference and coverage of the base stations, mobile stations, and portable stations. As personal communications networks (PCNs) proliferate, real-time signal strength measurements will become increasingly important for interference control, capacity control, grade of service, and detection of fraudulent users or transmitters which provide excessive transmitter power or are somehow not properly controlled. For example, future digital radio systems are likely to use dynamic power control for each of the subscriber (mobile or portable) transmitters in order to maintain a desired grade of service for each subscriber. As another example, adaptive antennas might be used to dynamically change where radio energy is radiated based on real-time signal strengths on a wide range of channels. Measurements of signal strength in real time on many frequencies will be a vital element to such dynamic systems. Furthermore, the ability to locate fraudulent users or uncontrolled transmitters will become more important.

SUMMARY OF THE INVENTION

It is therefore an object of the present invention to provide a portable real-time network monitoring system for field testing and troubleshooting a cellular telephone network, paging network or mobile radio system.

It is another object of the present invention to provide a user friendly interface between a user and a scanning radio receiver which displays, monitors and stores parameters related to real-time performance of a cellular telephone or paging network.

According to the present invention, a portable all-band radio receiver capable of receiving cellular and paging frequencies, as well as other radio service frequencies, is connected to a computer, such as, for example, a lap-top computer suitable for mobile operation at remote sites, a personal computer (PC), or computer workstation. An interface board is installed within the radio receiver which taps available signals within the receiver as well as allows the computer to control the receiver frequency selection, band designation, and demodulation technique. The interface board hardware and microcode cooperate to process and decode received signals according to cellular and paging network industry standards. The decoded signals are then fed via a connector cable into the serial port of the computer. An application running on the computer is provided which utilizes the processed signals to permit complete automated reception, display and storage of cellular, paging, PCN, and mobile radio signals. All cellular transmissions are captured in real-time so that a user can measure such parameters as overhead messages (including Digital Color Code (DCC), Supervisory Audio Tone (SAT), etc.), track the calls of Mobile Identification Numbers (MINs) to test MINs for diagnostic purposes, read Electronic Serial Numbers (ESNs), and Station Class Marks (SCMs) in order to diagnose MTSO functions, signal strengths, and HEX data transmissions for a variety of common cellular network systems. All monitored activity is displayed on the computer screen and is written to a disk in an organized ASCII or HEX file for instant retrieval and analysis. Masks can also be specified by the user which allow only selected data to pass or not pass through the system. The masks may be used to trigger devices, such as, for example, alarms or printers when selected data is detected.

In addition, the invention can be used to capture all paging traffic using common standards such as NEC, POCSAG and GOLAY as well as providing automated RF signal strength measurements. Transmissions of any tone, numeric, or alphanumeric pages are automatically decoded and displayed in real time, making it well suited for real-time traffic measurements. All measurements are stored on disk for rapid retrieval and analysis. A key-page mode is provided that screens the paging traffic in real-time to allow the user to selectively receive only certain pages, message lengths, cap-codes, or paging standards. Alarms may be triggered when selected data is detected. An extremely easy-to-use menu type computer interface allows the user to quickly adjust settings and parameters of the invention with special "hot keys" on the computer.

BRIEF DESCRIPTION OF THE DRAWINGS

The foregoing and other objects, aspects and advantages will be better understood from the following detailed description of a preferred embodiment of the invention with reference to the drawings, in which:

FIG. 8 is a user friendly display screen for monitoring a cellular network;

FIG. 10 is a user friendly screen for monitoring a pager network; and

DETAILED DESCRIPTION OF A PREFERRED EMBODIMENT OF THE INVENTION

Figure 1:
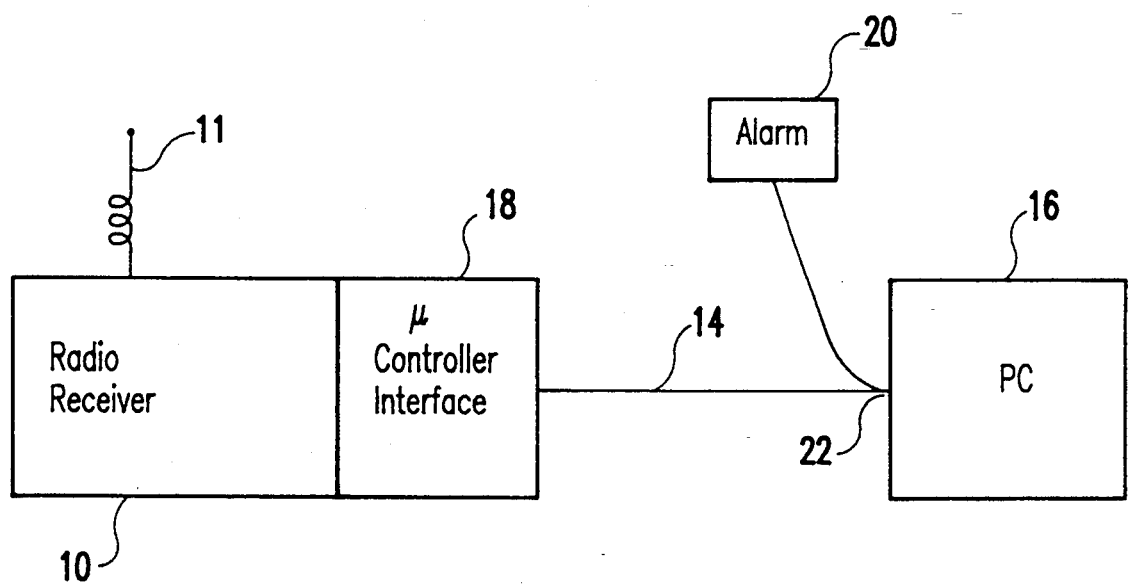
FIG. 1 is a block diagram showing the components of the paging or cellular monitoring system.

Referring now to the drawings, and more particularly to FIG. 1, there is shown a block diagram showing the components of the cellular telephone and paging network monitoring system. The system includes a radio receiver 10 modified according to the present invention with a microcontroller interface 18 which is connected by a cable 14 to the serial port 22 of a controlling computer 16. In the preferred embodiment the radio receiver 10 is a frequency agile VHF/UHF receiver, such as, for example, a commercially available ICOM R7000, capable of receiving paging traffic operating in the 25 MHz to 2000 MHz band as well as Advanced Mobile Phone System (AMPS) traffic and U.S. Digital Cellular (USDC) control and traffic channels operating in the 800 MHz band. The stock 15 KHz IF filter in the ICOM R7000 is well suited for paging reception; however, if the user wishes to use the system for cellular reception, it will be necessary to modify the receiver with a wider 30 KHz IF filter. Details of the ICOM R7000 receiver, including theory of operation, can be found in the manufacture's service manual which is herein incorporated by reference. A trigger device 20 is also provided to alert the user or trigger an alarm or remote device if user selected radio data is detected.

Figure 2A:
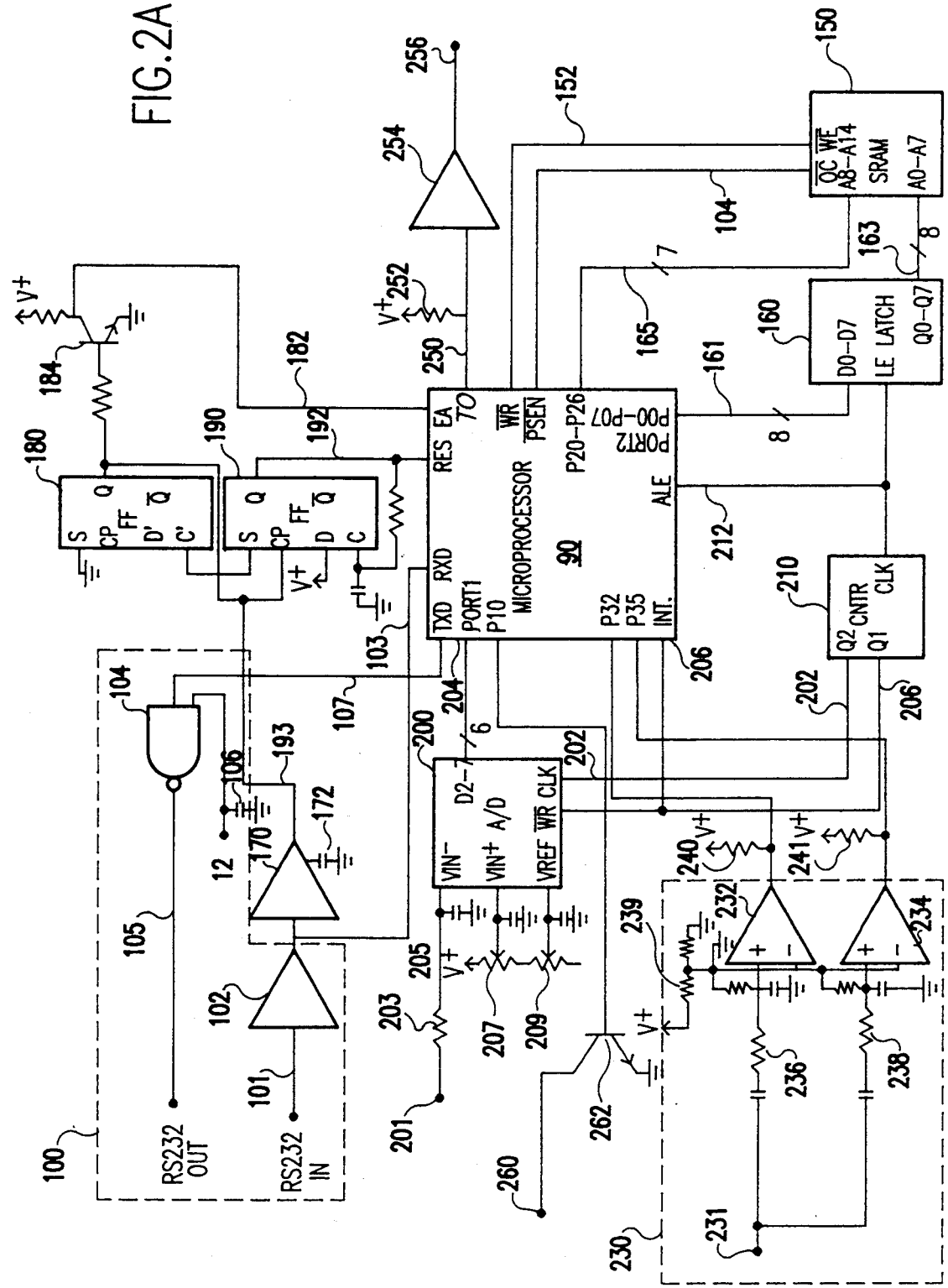
FIG. 2a is a schematic showing the components of the radio receiver/computer interface board.

Referring now to FIG. 2a there is shown a schematic of the microcontroller interface 18 used to translate between the receiver 10 and computer 16 of FIG. 1. The hardware of interface 18 is in the form of a circuit board which mounts within the receiver 10 and runs a microprogram which decodes and digitizes received signals which are fed to the RS232 port 22 of the computer 16. The microcontroller 90 is built around an Intel 87C51 microprocessor chip which includes an Electrically Programmable Read Only Memory (EPROM), Random Access Memory (RAM), serial and parallel Input/Output (I/O) port, timer, and interrupt hardware on the chip. Of course it is understood that many comparable chips, including digital signal processors, are commercially available which would also be suitable. Level converter circuitry, generally referred to by reference numeral 100, is used to convert Transistor-Transistor Logic (TYL) level signals from the microprocessor 90 to RS232 (nominally 9 Volts) level signals for interface with the computer 16, and visa-versa. Serial data from the RS232 port 22 of the computer 16 is converted to TTL level signals by an amplifier 102, such as, for example, an MC1489. The converted signals are then fed into the serial input port 103 of the microprocessor 90. Similarly, TTL level data from the serial output port 107 of the microprocessor 90 is fed into a NAND gate 104, which converts the TTL level signal to RS232 level. A provision may be made to connect a slew-rate limiting capacitor to the output of the NAND gate 104 for strict compliance with the RS232 standard regarding the transition time of an output signal.

External memory chip 150, which could be, for example, a 62256 static RAM (SRAM) chip, is provided which permits up to 32K bytes of additional program code to be downloaded over the serial port 101. Data loaded into static RAM 150 over lines 163 is latched from Port 2 161 of the microprocessor 90 via latch 160, such as, for example a 74LS373 latch. The latch 160 is clocked by the microprocessor 90 ALE signal 212. Although the integrated EPROM is sufficient for storing existing program code for decoding cellular, paging, and RSSI data, external memory 150 is provided to allow for easy software upgrading in the field. Interface is by the standard external memory configuration, with data line 165 and $\overline{WR}$ 152 serving as a write strobe and $\overline{PSEN}$ 104 serving as the read strobe.

Reset control circuitry, which essentially consists of operational amplifier 170, and flip-flops (FFs) 180 and 190, is provided which allows the host computer 16 to reset the microprocessor 90, as well as control the switching between internal and external program memory. A reset is applied by the host computer holding the T×D line active (a break signal) for about 250 msec. This is sufficient time for a capacitor 172 on the operational amplifier 170 to discharge and allow the output 193 activate the reset signal 192. Since the capacitor 172 discharges while the power is off, this circuit also provides a reset signal when the power is first switched on. The reset signal sets both flip-flops 180 and 190. Flip-flop 180 is used to control the microprocessor's EA (External Access) pin 182. When this pin is low, the internal EPROM is disabled and all code is executed from external memory. When the pin is high, the first 4K of code is taken from internal EPROM, and the other 60K from external memory 150. Therefore, an initial reset sets the pin 182 high, so the microcontroller 90 can execute its internal program (the external memory, being volatile, will not retain a viable program when the power is off). A transistor 184 may be used to drive the EA pin 182 depending on the current requirements of the particular microprocessor used.

An analog-to-digital (A/D) converter 200 is used to convert the receiver's automatic gain control (AGC) voltage into a received signal strength indicator (RSSI) data signal. The input voltage and reference voltage to the converter 200 may be adjusted as necessary via variable resistors 207 and 209, respectively. The A/D converter 200 converts the receiver's AGC signal at input 201 through resistor 203 and capacitor 205. The AGC signal of the ICOM R7000 all-band receiver, which is about 4 V with no signal and decreases to about 1 V at saturation ($-5$ dBm at the antenna terminal), is converted by the A/D converter 200 to a 6-bit binary number which increases from 0 (no signal) to 63 at maximum signal. The invention can of course be extended to a seven-bit binary number by using seven lines on the data bus 204, in which case the value 127 would represent maximum signal strength. The AGC has a dynamic range of about 90 dB in signal strength variation. The AGC voltage starts to change almost at the noise floor of the receiver and saturates when a signal of about $-5$ dBm is received at the antenna terminal. Typically, the receiver is adjusted so a $-120$ dBm signal is considered no signal, and a $-25$ dBm signal will saturate the A/D converter 200 at 63, the maximum signal strength. The A/D converter 200 is based on, for example, an ADC0804 general-purpose CMOS successive-approximation converter chip.

A CD4040B 12-stage ripple counter chip 210 is used to derive clock signals for the A/D converter 200 from the microprocessor's ALE line 212, which is a constant 1.8432 MHz clock unless external data memory is accessed. ALE divided by 4 (460.8 KHz) is used as the basic converter clock 202. The A/D converter 200 is triggered to start a conversion at a rate of ALE/4096 (450 Hz) by the Q1 output 206 of the ripple counter 210. The converter 200 supplies 450 samples per second to the microprocessor 90 via the 6 (or 7) high bits of Port 1 204. The 450 Hz sample clock is also supplied to External Interrupt 206 to interrupt the microprocessor 90 when a new sample is available.

Frequency shift key (FSK) modulated signals from the receiver are fed to input 231 of discriminator circuit 230 to be demodulated. Data slicing comparators 232 and 234 essentially perform a flash-conversion one-bit analog-to-digital conversion. The signal is AC coupled by resistor and capacitor networks 236 and 238 to remove any tuning or bias error and fed into the non-inverting inputs of comparators 232 and 234. This signal is then compared to a reference level equivalent, provided at the inverting inputs of comparators 232 and 234 by a voltage divider 239, to the average voltage. If the instantaneous voltage is higher than average, which means the instantaneous transmitter frequency is higher than average, the comparator output will be a TTL high level. The digital output from the comparators 232 and 234 are then fed across pull-up resistors 240 and 241 to the microprocessor 90 for decoding into cellular and pager network data which is currently being received by the receiver. The comparators 232 and 234 may be implemented with, for example, one-fourth of an LM339 quad comparator. It should be noted that ordinary general-purpose operational amplifiers (op-amps) are unsuitable for hard-limiting a signal higher than a couple of KHz because their bandwidth is intentionally limited to give stable linear-amplifier performance.

Output 260 which is connected to transistor 262 can be activated by a computer function key to turn off the receiver speaker (not shown) to comply with Federal regulations regarding unauthorized listening to private telephone conversations.

Receiver functions such as frequency selection, scan operations etc., are controlled by the microprocessor 90 by control line 250. The control signal on line 250 which, subject to pull-up resistor 252, is supplied an input of an operational amplifier 254. The amplifier output 256 is connected to the CI-V line (not shown) within the Icom receiver. This essentially allows the interface board to override and control the frequency selection and band designation of the receiver 10.

The actual dam transmitted by paging and cellular networks is normally done according to accepted industry standards. It is the task of the microcode, running on the microprocessor 90, to decode the raw data into useful information according to these standards. Currently, there are several cellular and paging standards world-wide which are now in practice including ETACS, which is the European cellular standard and U.S. AMPS/Dual mode IS-54 (U.S. Digital Cellular) standard, which is described in EIA/TIA Interim Standard Cellular System Dual Mode Mobile Station—Base Station Compatibility Standard, IS-54, May 1990, and is herein incorporated by reference. Examples of paging standards include POCSAG, GOLAY, and NEC, to name a few. Although the code of the preferred embodiment is written according to present day industry cellular and paging standards, it can be appreciated by those skilled in the art that the code could easily be modified to accommodate standard changes, for both analog and digital channels, within the scope of the present invention without the need to modify the hardware. For example, the ERMES paging standard is easily decoded by using a second discriminator circuit 230.

Figure 2B:
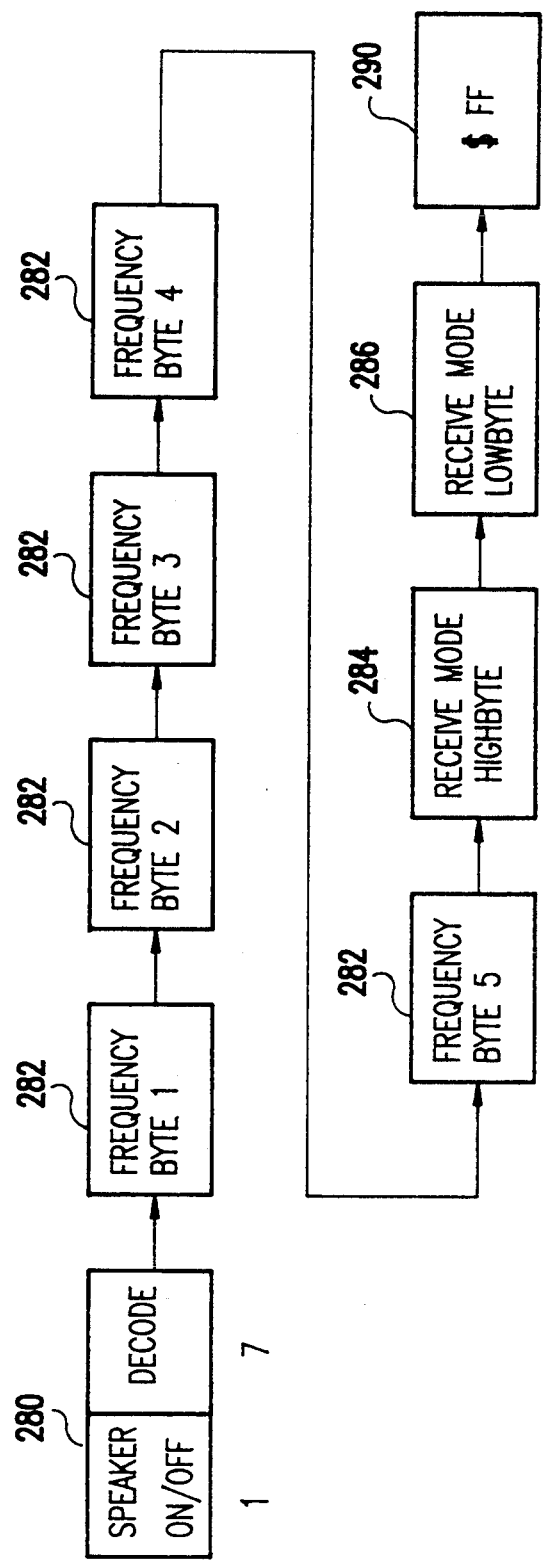
FIG. 2b is a diagram showing the serial byte sequence for interface control data sent from the computer.

The information passed from the computer to the interface includes the 1) receiver frequency selection, 2) the decode mode (i.e. FCC, FVC, RCC, and RVC if monitoring a cellular network, or NEC, GOLAY, POCSAG, or Auto detect, etc. if monitoring a paging network), and 3) receiver demodulation mode (i.e. AM, FM, SSB, and NBFM). These control data are sent on the serial port as bytes of eight data bits with a ninth start bit, which is always high, followed by $FF. FIG. 2b shows the serial byte sequence of the control data. The first byte is the decode byte 280. The first bit of the decode byte 280 is used to turn the receiver's speaker (not shown) on and off and the lower seven bits dictate the decoding standard to be used for decoding received radio data. Decode byte 280 is followed by five frequency selection bytes 282 which contain the packed BCD representation of the frequency in Hz. Each frequency byte 282 represents two digits with the first byte representing tens of Hz, the second representing thousands of Hz, and so on, until the fifth byte, which represents hundreds of MHz. The receiver demodulation mode is sent as two bytes 284 and 286. Any one, two or all three of these control data can be sent as long as they are in the proper order and $FF 290 is sent after the last byte.

The interface sends two types of data to the computer 16 for further processing: actual radio transmitted data (cellular or paging) and Received Signal Strength Indication (RSSI) data. Two 8-byte buffers are set up in internal RAM for the two types of data.

Figure 3:
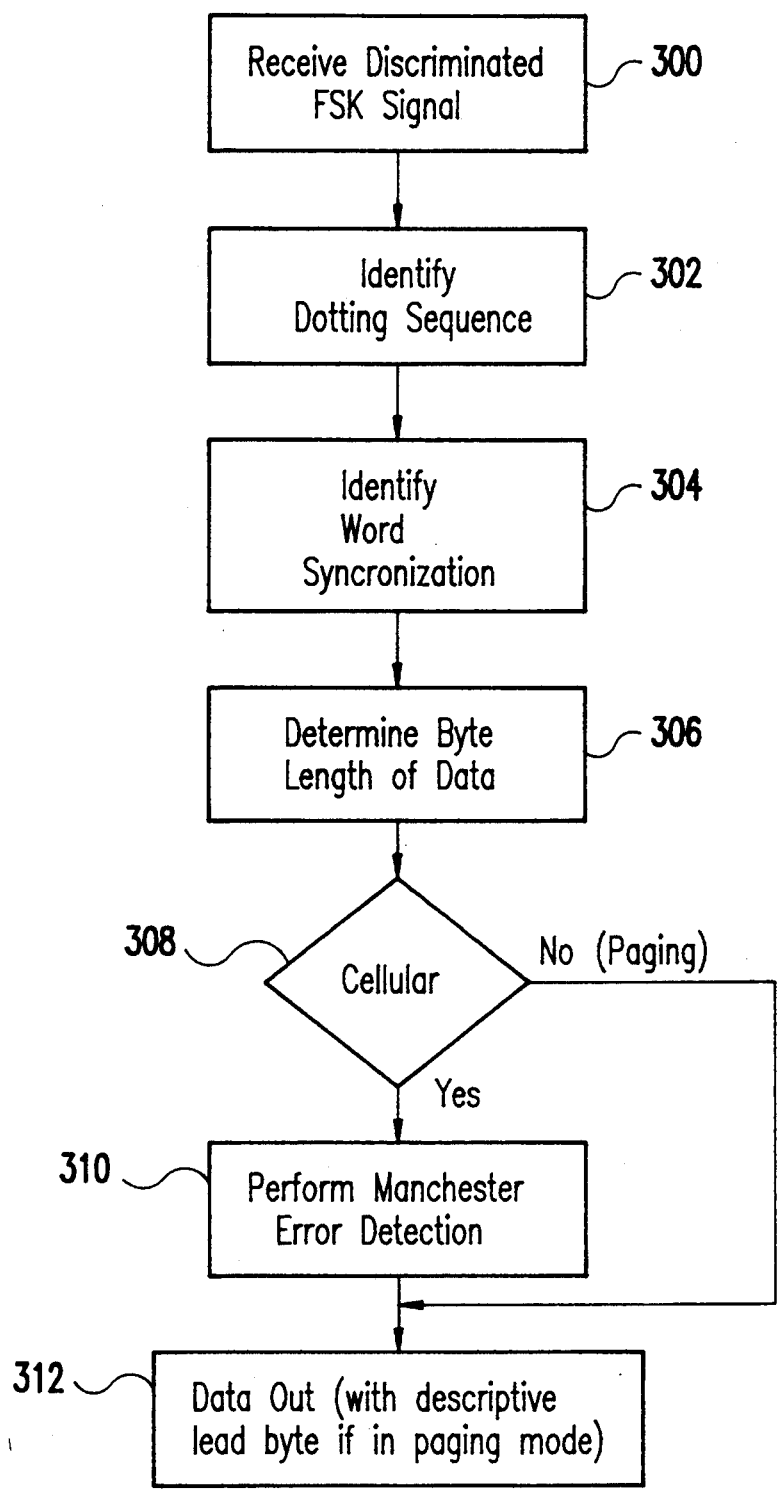
FIG. 3 is a block diagram showing the steps taken to decode received radio data.

Referring now to FIG. 3 there is shown a flow diagram outlining the basic steps performed by the microcode to process incoming radio signals. Starting with block 300, a discriminated FSK signal is received which is essentially a continuous stream of data. The data stream is monitored for a dotting sequence, block 302, and then for a word sync sequence at block 304. A dotting sequence of some length (1010 . . . 101) and a word sync sequence (111000 10010) are sent to permit mobile stations to achieve synchronization with incoming data. Proceeding to block 306, data of some standard predetermined length follows the sync word. If at block 308, the current mode of operation involves monitoring a cellular network, then the length of data which follows the sync word determines the channel monitored. This is fully detailed in the IS-54 EIA/TIA Interim Standard. At block 310, Manchester error detection is performed on the data. At block 312 the data is placed in the data buffer. If the current mode of operation involves monitoring a paging network then the Manchester error correction block 310 is skipped and the paging data and descriptive lead byte is immediately sent to the data (block 312). Paging data and descriptive bytes includes cap-codes and accompanying tone, alpha or numeric data.

Figure 4A:
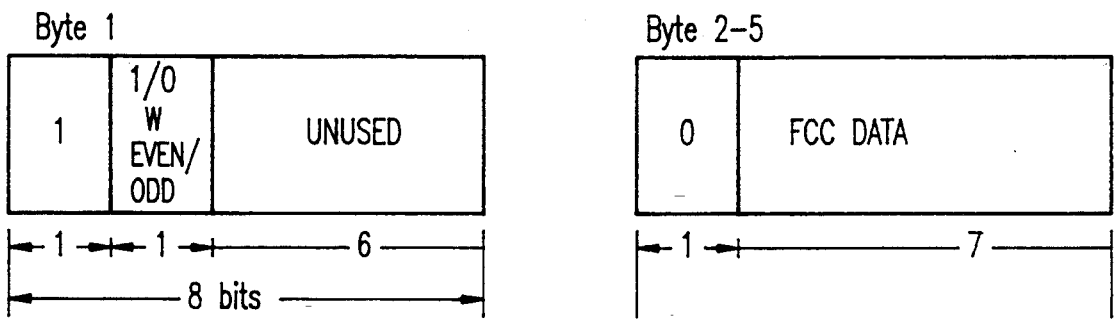
FIGS. 4a–4d are diagrams showing the bit patterns produced when decoding the FCC, FVC, RCC, and RVC channels, respectively, of a cellular network.

FIGS. 4a–d show the bit patterns produced when decoding the FCC, FVC, RCC, and RVC channels, respectively, of a cellular network. Referring now to FIG. 4a, FCC data from the radio is received in a data stream containing 28 bits of data (actually 40 bits, the last 12 are parity bits; if the data does not match the parity bits, then it is never sent from the interface to the computer). This data is decoded from the radio as five bytes which constitute one FCC word. Each FCC data byte consists of 8 bits. In the first byte, the first bit is equal to 1 if the byte is the first of a five byte stream making up one FCC word. The first bit is equal to 0 for bytes 2–5. The second bit of the first byte is 0 if the byte corresponds to Word A, and 1 if the byte corresponds to Word B (Word A is detected by mobiles with even MINs and Word B is detected by mobiles with odd MINs). Finally, in bytes 2 to 5, the seven low bits contain the actual FCC data.

Figure 4B:
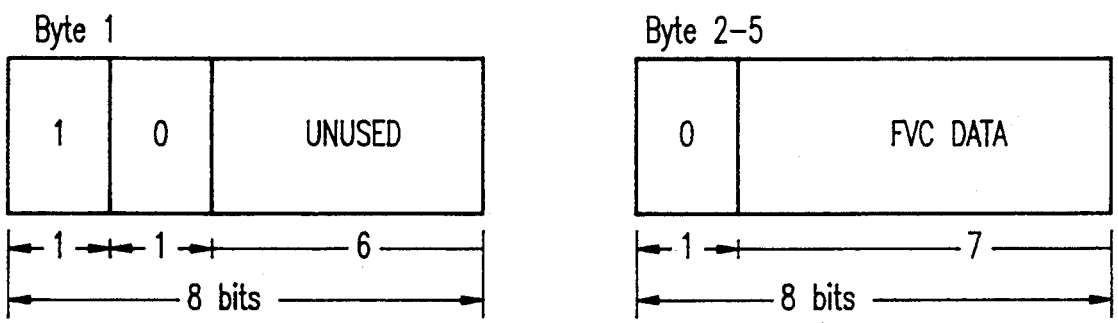

Referring now to FIG. 4b, the decoded bit pattern for FVC data is very similar to FCC data shown in FIG. 4a, except that since FVC data only has one message stream (not Word A and Word B since the standard only permits a mobile to listen to a voice channel). The FVC data bytes are identical in format to the FCC data bytes shown except that the second bit of the first byte has no particular meaning since there is only a single message stream.

Figure 4C:
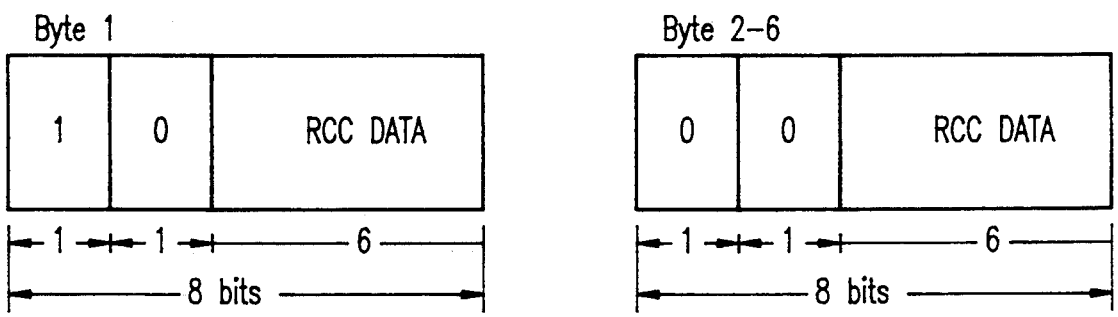
Figure 4D:
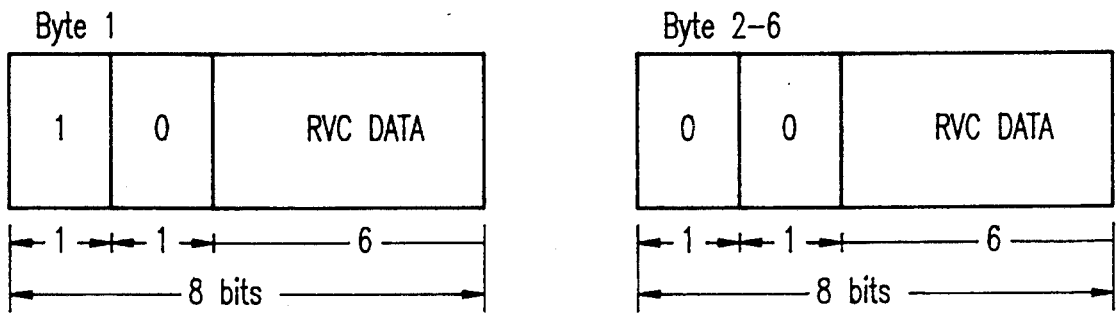

Referring now to FIG. 4c, RCC data words are made up of 36 data bits which are decoded into six bytes. As with FCC and FVC data, the first byte of a RCC word is 1 indicating that it is the first byte. The first bit of bytes 2-6 is always 0. The second bit of bytes 1-6 are not used. The remaining 6 bits of bytes 1-6 actually contain the RCC data.

Referring now to FIG. 4d, RVC data words are decoded in exactly the same manner as RCC data words described above with reference to FIG. 4d.

Figure 5:
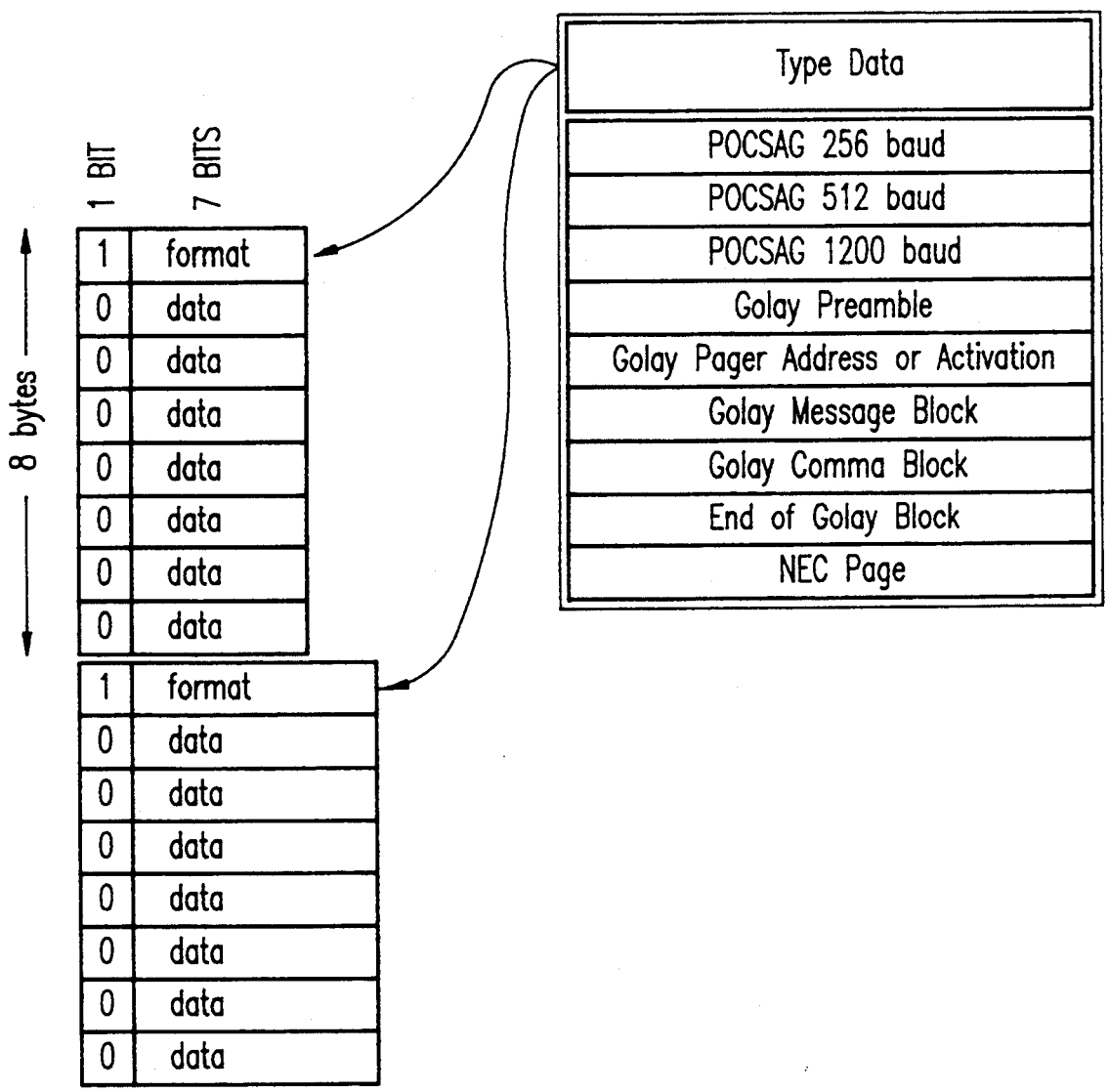
FIG. 5 is a diagram showing the bit patterns produced when decoding a paging network.

FIG. 5 shows the bit patterns produced when decoding a paging network. Each page word consists of 8 bytes, each having 8 bits. The first byte of the page word is the descriptive lead byte and is identified as such by a first bit of 1. The first bit of bytes 2-8 is always 0. The remaining 7 bits of the descriptive lead byte specifies the type of page message data which follows in the lower seven bits of bytes 2-8 (i.e. POCSAG, GOLAY, NEC, etc.). If the page message is longer than one page word then the descriptive lead byte of the next page word specifies the same format as the previous one did. This stream of decoded page words continues indefinitely while in a paging decode mode. If two different page messages of the same format are received consecutively, they are separated by a descriptive lead byte with the lower 7 bits indicating end-of-message rather than a data type.

Figure 6:
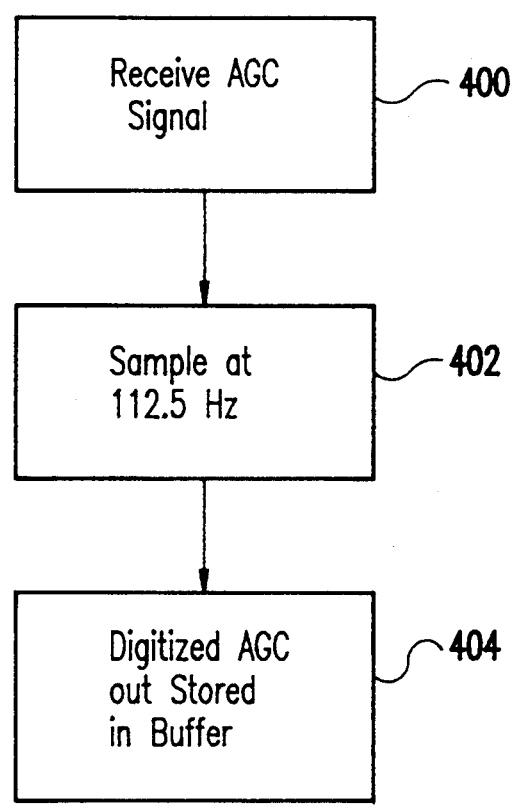
FIG. 6 is a block diagram showing the steps taken to determine the RSSI level from the Automatic Gain Control (AGC) signal.

Referring now to FIG. 6, there is shown a flow diagram outlining the essential steps to obtaining RSSI data which is continually being collected for a monitored frequency. As discussed above, the AGC signal available from the receiver is received by the interface at block 400. The AGC signal is sampled at 112.5 Hz (block 402) and the digitized signal is sent to a RSSI buffer (block 404) prior to being sent to the computer. The AGC signal is considered linear with respect to RSSI values over the range that it is sampled. Therefore, it is possible to map the digitized signal to a corresponding RSSI value. In an alternate embodiment, a signal having a known signal strength may be digitized and compared to the digitized AGC signal in order to determine the actual RSSI level of a received radio signal.

Since both radio data and the RSSI data must be sent from their respective buffers to the computer serially, all serial output from the microprocessor 90 is interrupt driven. Two data pointers point to the current byte in the data and RSSI buffers. The serial port interrupt is set to low priority so it will not disturb the data receiving and decoding process. When the serial port is ready for another byte, it causes a serial port interrupt. When this interrupt is processed, the routine first checks if any data is in the decoded radio data buffer. If so, it is transmitted first (all decoded radio data has priority over RSSI data, but no RSSI samples will be lost since the RSSI collection rate is slow enough to prevent overflow of the RSSI buffer). If no decoded radio data is buffered, the RSSI buffer pointer is examined, and if RSSI data is available, it will be transmitted. Otherwise, both buffers are empty. In this case, a serial idle flag in RAM is set and the interrupt routine exits. Radio data (including cellular or pager data) and RSSI data bytes are removed from their respective buffers and serially transmitted to the computer.

Figure 7:
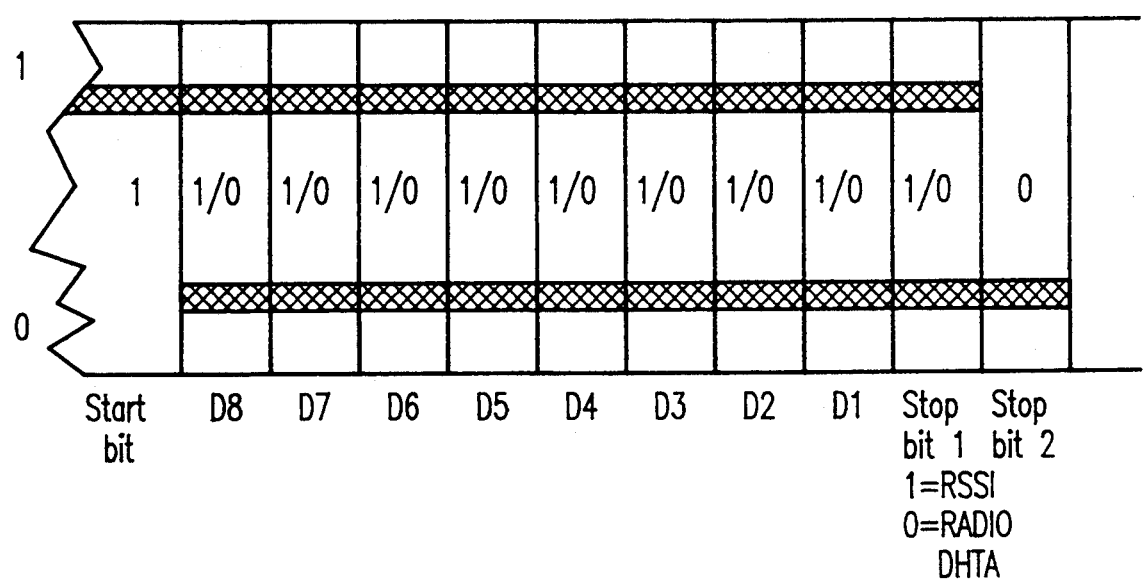
FIG. 7 is a diagram showing the serial data stream sent from the interface to the computer.

The data is sent serially from the interface 18 via a cable 14 to the RS232 ; port 22 of the computer 16 as shown in FIG. 1. The data is sent as a serial stream of 8 bits with 1 start bit and 2 stop bits, as shown in FIG. 7. The start bit is always 1 and the second stop bit is always 0. If the first stop bit is 1 then bits D8-D1 are RSSI data. If the first stop bit is 0 then D8-D1 are radio data. The computer runs a user-friendly application for displaying, storing and processing the data signals. The computer is preferably of the portable type, such as a battery powered lap-top computer which is well suited for mobile field use.

Referring now to FIG. 8, a typical user-friendly display screen for monitoring a cellular network is shown. The display screen can be of any type which is connected to the computer, workstation, or the like, modified with the interface 18 according to the present invention. The display 500 essentially consists of three windows for displaying message data, the status window 502, the message window 504, and the grid window 506. The status window 508 displays the present AMPS channel number being received, the channel mode (FCC, RCC, FVC, RVC), the received signal RSSI in dBm (i.e. quanitative RSST data), the threshold RSSI level for which signals must be stronger in order to record activity, the cellular system bank (A or B), the RSSI statistics update interval, the home control channel, the amount of hard disk space available, and the System Identification (SID), DCC and other system parameter information about the FCC. The message window 504 displays all of the decoded traffic activity and RSSI data which is logged in real time to a designated file on disk. In FCC mode the message window displays all pages, addresses, reorders, retries, originations, and other control signals on the FCC. In the RCC mode, the MINs, ESNs, SCM, message response, and destination telephone numbers are displayed. While monitoring the FVC or the RVC, the message window displays the channel number, minimum, average, and maximum signal strength of the received signal, channel handoff instructions, power level, order conformations, and other cellular radio data transmissions. All transmissions by either the MTSO or the mobile unit are also monitored and recorded so that handoff assignments can be monitored. The grid window 506 displays a portion of the complete bank of channels assigned to either the A or B service provider. More channels will appear if the user scrolls the screen with the arrow keys. A bargraph indicating signal strength can be superimposed on the grid by depressing a function key. This bargraph (not shown) can be used with a directional antenna connected to the receiver 10 to locate transmitters based on signal strength. By depressing another function key it is possible to switch the grid between the A and B service providers. Other function key features are shown on the bottom of display 500.

The top line of the display 500 displays the mode selection bar 508 which is preferably the pull-down menu type used for allowing the user to select between various operational modes, including OPTIONS, GRID, CHANNEL MONITOR, FOLLOW CALL, and STATISTICS. The OPTIONS mode permits the user to select the stored data written to disk be in ASCII or HEX format and to specify one or more MIN or NOT MIN masks. These masks permit only selected data to pass and be processed by the system. This feature is useful for screening traffic to particular mobile telephone numbers, exchanges, area codes, or trunks. The GRID mode permits the user to construct a specific list of voice channels associated with a particular control channel while displaying the list on the grid display 506. In this manner the channel assignment scheme of any cellular radio system can be determined automatically by monitoring the channel assignments made by the FCC. In addition, this mode permits the user to specify non-standard control channels for special testing of new services which is sometimes done by carders and manufacturers.

The CHANNEL MONITOR mode permits the scanning and decoding of any channel or group of channels to instantly determine which FCC, RCC, FVC, or RVC are active and at what RSSI level. A minimum RSSI threshold level can be set so that channels having signals below this level are ignored. The CHANNEL MONITOR mode allows the user to follow calls, measure traffic, scan channels, conduct bench tests, conduct drive tests and do A/B comparisons.

The FOLLOW CALL mode monitors the FCC or the RCC to detect specific calls. In RCC operation, the user may specify a plurality of MINs, NOT MINs, ESNs, NOT ESNs, or destination numbers which, when detected, trigger an alarm or may cause the data to be printed. Once such a call has been detected on the RCC, the system can jump to the FCC to follow the call throughout the system. The computer interface 18 controls the receiver frequency such that all subsequent voice channels assignments or handoffs are also followed. In FCC operation, the system monitors the FCC for user specified MINs or NOT MINs. When there is a match, the call is "trapped" and is followed from the RCC to whatever voice channel the MTSO assigns. This mode provides a means for detecting fraud by detecting unauthorized users, subscriber usage profiles and provides drive test capabilities to determine network and subscriber equipment performance.

The STATISTICS mode allows statistics, such as gathering unique MINs and measuring analog and digital cellular traffic, over a user specified period of time as ranging from one minute to one month. Statistical data received during the time interval is written to a statistics file. This mode is particularly useful to profile user demand in "hot-spots" of a coverage area, or particularly active subscriber MINs. This information can be helpful to determine MTSO problems, finding fraudulent users using cloned MINs, and for locating new micro cell sites in heavy usage areas. STATISTICS mode can also be used to provide an inexpensive way for a service provider to determine the proper balance between cell site transmission power and origination demand by subscriber units. Alarms 20, which signal the fact that particular MINs have exceeded a given amount of activity can also be set in the STATISTICS mode with the computer 16.

Figure 9:
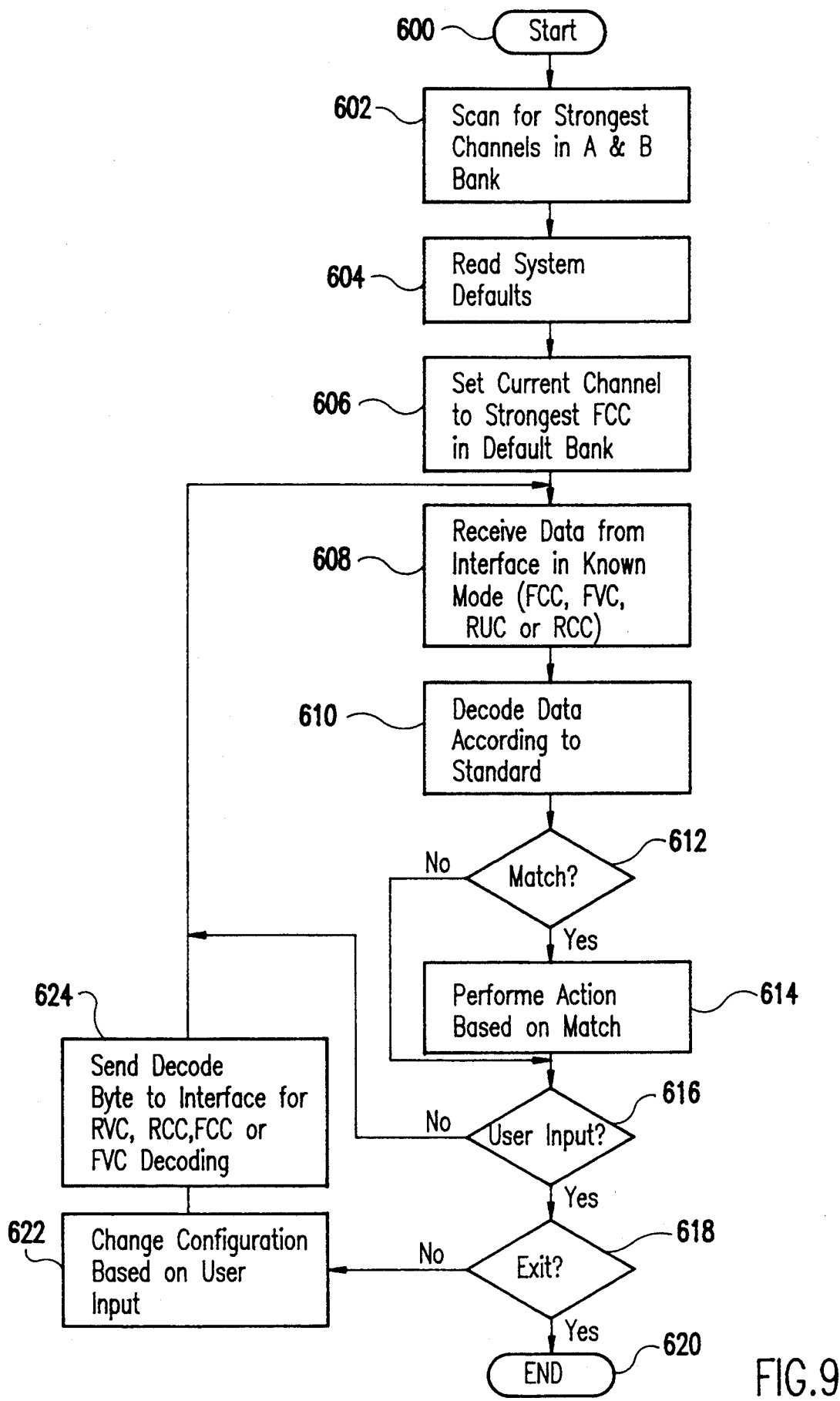
FIG. 9 is a flow diagram showing the steps taken by the computer when using the invention to monitor a cellular network.

FIG. 9 is a flow diagram showing the steps taken by the computer when a field technician is using the invention to monitor a cellular network. Proceeding from start block 600 to block 602, the computer is instructed to scan cellular frequencies to determine the strongest channels in the A or B banks at block 602. The A and B banks refer to channels assigned to competitive cellular service providers by the Federal Communications Commission within the same market. In international markets, such as in, for example, New Zealand, a service provider a service provider may use channels in both the A and B banks. The strongest channels are displayed in an initialization window (not shown) of the display 500. At block 604, the system option mode defaults are read from disk and the receiver is set to the strongest FCC in the system defaults at block 606. At block 608, microcontroller interface decoded cellular data is sent to the computer, for the first pass, this will always be FCC data due to the nature of the defaults; however, on subsequent passes the cellular data may be FCC, FVC, RVC, or RCC. At block 610 the data bytes are analyzed according to the appropriate standard to determine such parameters as MIN, ESN, SCM, MTSO transmissions, etc. All data decoded is compared to the user masks discussed above. If, at decision block 612, a user masked parameter is matched to the incoming data, then some action is performed such as displaying a bar graph indicating RSSI, printing received data, triggering an alarm, displaying data on screen 500 of FIG. 8, following the call if in FOLLOW CALL mode, or organizing data in a HEX or ASCII file and witting to a disk. At decision block 616, the system checks to see if the user has input a command to the system. Such an input may be in the form of a keystroke, menu command, or the like. If no input is detected, the system loops up to block 608 and the next stream of FCC data is received. If at decision block 616 it is determined that the user has made an input, then at decision block 618 if the input was an exit command, the program is ended at block 620. If the input was not an exit command then the system configuration of current mode of operation is changed according to the user input at block 622. This change of configuration could be for example, an option change, a mask change, or a mode change directing the receiver to monitor and decode another channel such as the RCC, FVC, or RVC. It is noted that in certain options modes such as CALL FOLLOW the system configuration may change automatically at this point due to the received data from the microcontroller interface 18. At block 624, the interface is sent a decode control byte based on the user input at block 616 to select the appropriate decoding standard. Once the system has been reconfigured the system is ready to receive the next data bytes from the interface at block 608.

Four types of files relating to cellular networks may be compiled and stored on disk. First log files, which are the real-time recordings of every message, and every operation conducted by the system during a session. Second, statistic files, which are the periodic tallies of the traffic statistics for the FCC or RCC. Third, UNIQUE MIN statistics file which produce a tally of traffic and provide a list of unique MINs and their call activity. Finally, MATRIX files which are lists of voice channels, a single standard control channel, and one or more non-standard control channels for Bank A and Bank B.

Referring now to FIG. 10, a typical display screen is shown for monitoring pager networks or mobile radio systems. In this case, the screen 700 consists of two windows: a STATUS window 702 and a MESSAGE window 704. The STATUS window 702 displays received data parameters such as RSSI, operating mode, time of day, number of pages currently in the data buffer and the amount of space remaining on the computer hard disk drive. The MESSAGES window 704 displays a running list of data such as received frequencies, RSSI, cap-codes, and page messages. A pull-down menu bar 706 across the top of the screen allows user selectable operational modes. The primary operation mode windows include OPTIONS, KEY PAGE, RECORD, and SCAN.

The OPTIONS window permits the user to designate the paths for files to be written to disk to be set, select a disk write interval, and set the receiver filter between NBFM, FM, AM, or SSB demodulation modes.

The KEY PAGE window pulls down and allows the user to specify a wide range of selective screens on the incoming paging traffic, so that only certain messages or cap-codes are displayed and recorded, and may also be printed. KEY PAGE window allow the user to enter a frequency for the receiver and change the LOG file name for the flies written to disk. The latter is convenient when the user wishes to begin collating a new record of activity. Different paging standards can also be activated in KEY PAGE window such as, for example, POCSAG, GOLAY, or NEC. A received page that is transmitted in a non-activated standard is ignore. Masks can be created to allow the user to selectively record only specified cap-codes or messages. Wildcards such as "*" or "?" can be used to specify a character or string of characters within a cap-code or message permitted to pass or not pass through the masks. These masks can be created and saved on disk for future use. This feature is particularly useful for a service provider to monitor the paging system for billing, or for correlating the complaints of certain customers with the time of day.

The RECORD mode is useful for recording all of the paging activity on a particular frequency or for gathering RSSI data of particular transmitters. This mode is ideal for building a database of traffic activity for use in billing or market analysis study, or for locating transmitters based on RSSI measurements.

The SCAN mode accommodates two types of scanning operations. The sweep scan causes the receiver to sequentially sweep a number of frequencies which are equally spaced by a user specified frequency increment. Customized scan allows the user to create customized scanning profiles which can be stored on disk and used anytime. This is well suited for spectrum scanning over a known set of frequencies since over one thousand individual frequencies may be specified for scanning. The list of frequencies can be stored in an ASCII file on the computer 16 for later use.

Figure 11:
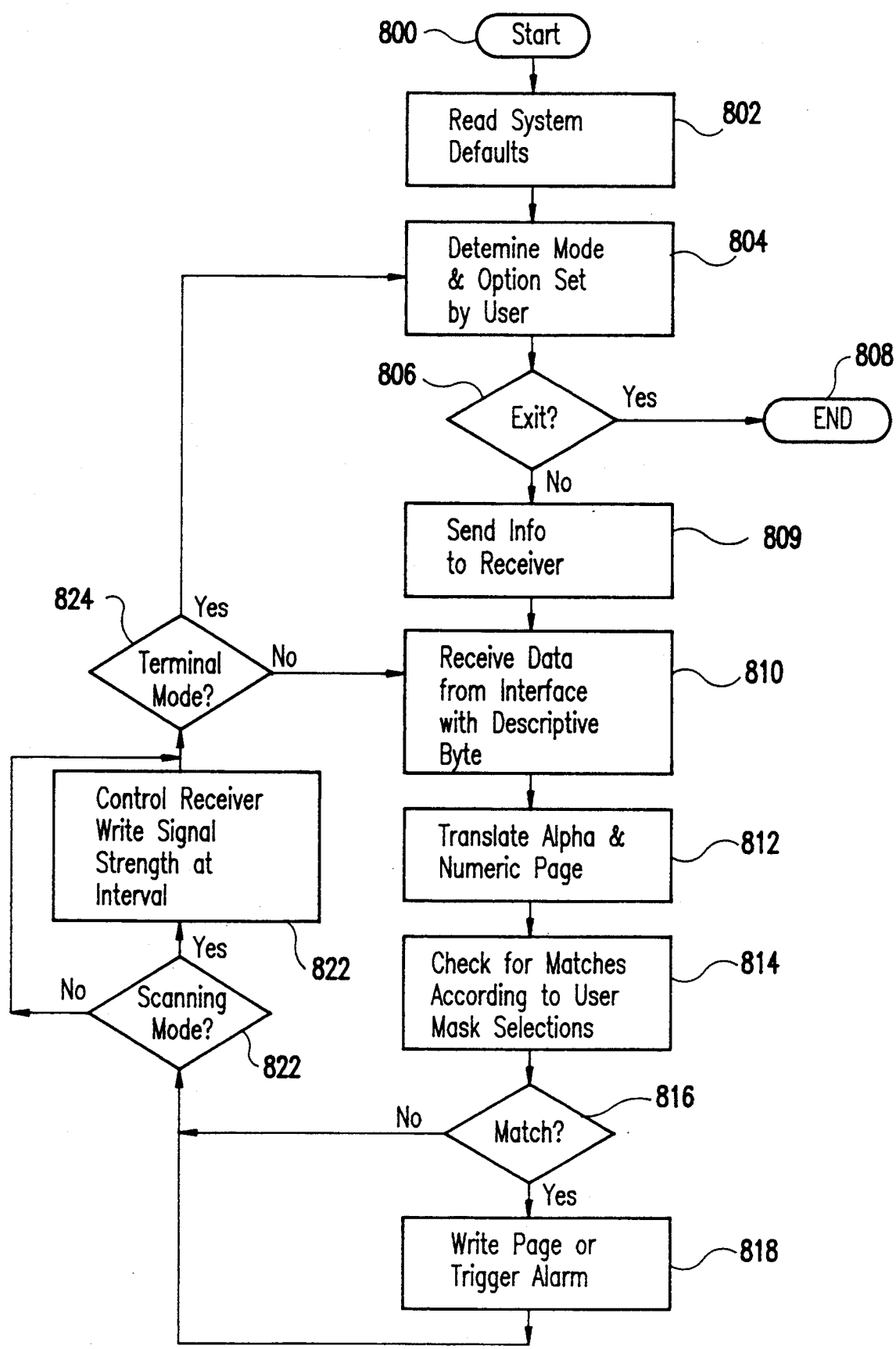
FIG. 11 is a block diagram showing how the system monitors a paging network.

FIG. 11 is a flow diagram showing the steps token by the system when a technician is using the invention to monitor a paging network. Starting at block 800, and proceeding to block 802, when the system is initially started, the system reads its default modes from disk. The system then waits at block 804 until the user selects a new option or mode or selects a "GO" command. If the user input is an EXIT command at decision block 806 then the program ends at block 808, else, the system proceeds to block 809 whereupon receiver control data is sent to the receiver based on the mode and options selected by the user at block 804. Proceeding to block 810, an eight byte decoded pager data is received from the interface, labeled with a descriptive lead byte. The descriptive lead byte identifies for the system the page standard, the baud rate, and additional information about the seven bytes that follows. The seven bytes of data are translated first as if they were an numeric message and second as if they were a alpha message at block 812. Example of this is shown in FIG. 10, reference numerals 708 and 710, respectively. One translation makes sense, and the other does not. Although the standard by which the page message was transmitted should specify the type of data to be translated, it is not uncommon for a company to deviate from the standard. Accordingly, the system translates page messages in both formats such that the user can always understand any page received by the system. Both sets of translated data are then compared against the user mask selections at block 814 to allow or disallow pages with specified cap-codes or messages. If at decision block 816 a match is determined then the page is written to the system operates on the page according current mode of operation and the user selected options. This may include displaying the page, writing the page to disk or a printer, or activating a trigger or alarm which is represented in block 818. After the operation or if no match is found (block 816), the system proceeds to decision block 820. If the user previously selected a scanning mode, then the receiver frequency is incremented accordingly and the received signal strength is ascertained, displayed and written to a file at block 822; else, the system next proceeds to decision block 824 to determine if the user has input a terminate mode command. If the mode has been terminated then the system loops to block 804 and awaits for a user input. If the mode has not been terminated, then the system loops back to block 810 and the next string of data is received.

The following are some examples which demonstrate how the present invention may be used to monitor a cellular network, paging network, or mobile radio system:

EXAMPLE 1

Scan all of the frequencies, at 12.5 KHz increments, between 150 MHz and 160 MHz, and create a complete listing of RSSI levels and paging activity found. This application allows the spectrum utilization to be measured in a scanning mode, identifies the signal strengths of all users in the radio spectrum, and identifies the paging standards being used in a particular market. All information is placed in a file and stored on disk for later retrieval and further analysis.

EXAMPLE 2

Use the system to determine customer billing by monitoring a particular service provider's frequency. A complete listing of the traffic, compiled in real-time, is produced and written to a HEX or ASCII file from which customer usage and billing can be determined.

EXAMPLE 3

Use the system to simultaneously and remotely update a plurality of electronic billboards or similar displays. Define a user mask to allow only a specified cap-code to pass and connect the trigger alarm to the updating mechanism of a billboard or display within a service area. Each time that cap-code is called, it will be detected by the system and the billboard will be updated based on the message sent by the cap-code.

EXAMPLE 4

Use the system to measure cellular traffic in eight different exchanges during rush hour. This application allows the user to monitor real time traffic statistics while compiling a table of every user, and their paging and channel assignment activity in eight different exchanges. At the same time a compilation of channel assignments, reorders, directed retries, etc. are also recorded. The STATISTICS file will contain a table of every UNIQUE MIN in each of the eight exchanges. Next to each MIN will be the total number of pages, and channel assignments over the entire observation interval.

EXAMPLE 5

Use the system to detect fraudulent use on the RCC. This application uses the FOLLOW CALL mode. Assume you suspect fraud users who make calls to international numbers regularly. You can identify such users by setting a mask to permit only calls to destination numbers with the international prefix "011" to pass and trigger the alarm.

EXAMPLE 6

A user can use the system to determine the performance of the MTSO by building a matrix file in the STATISTICS mode. All statistics for a particular channel can be acquired over a period of time. The matrix file can then be compared to against the MTSO reports, billing reports, market analysis etc.

EXAMPLE 7

Use the system to determine the long-term behavior of a base station or cell-cite monitoring the statistics and logging the real-time traffic. The average, minimum and maximum RSSI levels are displayed for each statistics record and are written to the disk at the statistics update interval. The statistics file can then be analyzed to determine how the RSSI changed at each interval to determine if the base station shut down at any point or experienced power fluctuations.

EXAMPLE 8

Use a subset of the system, such as only the radio receiver and the microcontroller interface, to build a custom cellular, paging or mobile radio monitoring system which uses a different computer interface or input/output device by using knowledge of the sequence of data bits produced by the microcontroller interface. Several such subsystems could be used in parallel wherein their outputs are sampled by a central computer in a round-robin or parallel fashion in order to simultaneously monitor multiple channels or frequencies.

EXAMPLE 9

A radio communication service provider can use the invention to measure radio signal energy from interference sources, such as, for example, energy from microwave transmitters used for fixed terrestrial communications or transmitters used in other radio systems which share radio spectrum. Based on detected and measured signal strengths the service provider could use the information to adapt channel allocation schemes, adjust base station and subscriber transmitter power levels, adjust antenna patterns, or to adjust a host of other radio system parameters.

EXAMPLE 10

Service providers for radio communication systems, such as, for example, trunked or satellite systems, could use the invention to take signal measurements throughout a geographical service region to map areas where signals are weak.

EXAMPLE 11

The antenna 11, shown in FIG. 1, could be a steerable antenna capable of being rotated to receive signals from any direction. A bargraph (not shown) on display 500, continuously indicates the signal strength of a of selected channel or frequency, as the antenna is rotated. In this manner, it is possible to find the exact location of fraudulent users or interference sources simply by moving in the direction the signal is the strongest.

While the invention has been described in terms of a single preferred embodiment and a few exemplary examples, those skilled in the art will recognize that the invention can be practiced with modification within the spirit rand scope of the appended claims.

Having thus described our invention, what we claim as new and desire to secure by Letters Patent is as follows:

1. A system for monitoring a radio communication system at remote sites within a service area in real time, comprising:
   a scanning radio receiver for receiving radio signals within a frequency range of said radio communication system, said radio signals including frequency shift keying (FSK) signals containing message data, and an automatic gain control (AGC) signal;
   a computer having a serial port and a display, said computer for controlling said scanning radio receiver; and
   an interface connected between said scanning radio receiver and the serial port of said computer, said interface comprising:
      an analog-to-digital (A/D) converter for sampling said automatic gain control (AGC) signal and generating a digitized automatic gain control (AGC) signal;
      a demodulator means for demodulating said frequency shift keying (FSK) signals and generating a bit stream of message data; and
      a microprocessor communicating with a memory, said memory storing a microprogram, said microprocessor receiving said digitized automatic gain control (AGC) signal and said bit stream of message data, said microprocessor executing said microprogram to convert said digitized automatic gain control (AGC) signal to a quantitative received signal strength indicator (RSSI) value and decoding said bit stream of message data according to a decoding standard for said radio communication system to generate a message,
   said interface communicating with said computer through said serial port, said computer simultaneously displaying said quantitative received signal strength indicator (RSSI) value and said message.

2. A system for monitoring a radio communication system as recited in claim 1, further comprising a trigger means connected to said serial port of said computer, said trigger means being activated when said computer monitors a user selected message over said radio communication system.

3. A system for monitoring a radio communication system as recited in claim 2 wherein said trigger means activates an updating means for updating a billboard.

4. A system for monitoring a radio communication system as recited in claim 1 wherein said radio communication system is a cellular network.

5. A system for monitoring a radio communication system as recited in claim 1 wherein said radio communication system is a paging network.

6. A system for monitoring a radio communication system as recited in claim 5 wherein said bit stream of message data is decoded according a plurality of decoding standards to generate a plurality of messages, said computer displaying said plurality of messages on said display.

7. A system for monitoring a radio communication system as recited in claim 1 wherein said radio communication system is mobile radio system.

8. A system for monitoring a radio communication system at remote sites within a service area in real time, comprising:
  a scanning radio receiver for receiving radio signals within a frequency range of said radio communication system, said radio signals including frequency shift keying (FSK) signals containing message data, and an automatic gain control (AGC) signal;
  a computer having a serial port and a display, said computer for controlling said scanning radio receiver and for monitoring and recording predetermined parameters related to the monitored radio communication system; and
  an interface connected between said radio receiver and the serial port of said computer, said interface comprising:
    an analog-to-digital (A/D) converter for sampling said automatic gain control (AGC) signal and generating a digitized automatic gain control (AGC) signal;
    a demodulator means for demodulating said frequency shift keying (FSK) signals and generating a bit stream of message dam; and
    a microprocessor communicating with a memory, said memory storing a microprogram, said microprocessor receiving said digitized automatic gain control (AGC) signal and said bit stream of message data, said microprocessor executing said microprogram to convert said digitized automatic gain control (AGC) signal to a quantitative received signal strength indicator (RSSI) value and decoding said bit stream of message data according to a decoding standard for said radio communication system to generate a message,
  said interface communicating with said computer through said serial port, said computer simultaneously displaying said quantitative received signal strength indicator (RSSI) value and said message.

9. A system for monitoring a radio communication system at remote sites within a service area in real time, comprising:
  a scanning radio receiver for receiving radio signals within a frequency range of said radio communication system, said radio signals including frequency shift keying (FSK) signals containing message data, and an automatic gain control (AGC) signal;
  a computer having a serial port and a display, said computer for controlling said scanning radio receiver; and
  an interface connected between said radio receiver and the serial port of said computer, said interface comprising:
    an analog-m-digital (A/D) converter for sampling said automatic gain control (AGC) signal and generating a digitized automatic gain control (AGC) signal;
    a demodulator means for demodulating said frequency shift keying (FSK) signals and generating a bit stream of message data; and
    a microprocessor communicating with a memory, said memory storing a microprogram, said microprocessor receiving said digitized automatic gain control (AGC) signal and said bit stream of message data, said microprocessor executing said microprogram to convert said digitized automatic gain control (AGC) signal to a quantitative received signal strength indicator (RSSI) value and decoding said bit stream of message data according to a decoding standard for said radio communication system to generate a message wherein said decoding includes at least one of:
      tracking cellular telephone traffic based upon predetermined indicia, and
      automatically decoding digital paging data transmitted in any of the protocol formats in a group of protocol formats consisting of:
        GOLAY;
        NEC, and
        POCSAG,
  said interface communicating with said computer through said serial port, said computer simultaneously displaying said quantitative received signal strength indicator (RSSI) value and said message.

10. A method for monitoring radio message data and relative signal strength indicator (RSSI) data for a radio communication system at remote sites throughout a service region, comprising the steps:
  controlling a scanning receiver to receive a radio signal of a particular frequency and producing an Automatic Gain Control (AGC) signal;
  monitoring and recording predetermined parameters related to the monitored radio communication system;
  digitizing said Automatic Gain Control (AGC) signal and converting the digitized signal to a quantitative RSSI level for said radio signal;
  demodulating said radio signal to produce a message bit stream;
  decoding said message bit stream according to a decoding standard to produce a message;
  transmitting said quantitative RSSI level and said message to a computer; and
  displaying said quantitative RSSI level and said message on a display screen.

11. A method for monitoring radio message data and relative signal strength indicator (RSSI) data as recited in claim 10 wherein said radio communication system is a cellular network.

12. A method for monitoring a radio message data and relative signal strength indicator (RSSI) data as recited in claim 10 wherein said radio communication system is a paging network.

13. A method for monitoring radio message data and relative signal strength indicator (RSSI) data for a radio communication system at remote sites throughout a service region, comprising the steps:
  controlling a scanning receiver to receive a radio signal of a particular frequency and producing an Automatic Gain Control (AGC) signal;

digitizing said Automatic Gain Control (AGC) signal and converting the digitized signal to a quantitative RSSI level for said radio signal;

demodulating said radio signal to produce a message bit stream;

decoding said message bit stream according to a decoding standard to produce a message wherein said decoding step includes at least one of:
(a) tracking cellular telephone traffic based upon predetermined indicia; and
(b) automatically decoding digital paging data transmitted in any of the protocol formats in the group consisting of:
GOLAY;
NEC; and
POCSAG;

transmitting said quantitative RSSI level and said message to a computer; and displaying said quantitative RSSI level and said message on a display screen.

14. A method for monitoring a radio message data and relative signal strength indicator (RSSI) data of a radio communication system as recited in claim 13 wherein said radio communication system is a cellular network.

15. A method for monitoring a radio message data and relative signal strength indicator (RSSI) data of a radio communication system as recited in claim 13 wherein said radio communication system is a paging network.

* * * * *

UNITED STATES PATENT AND TRADEMARK OFFICE
CERTIFICATE OF CORRECTION

PATENT NO. : 5,451,839
DATED : September 19, 1995
INVENTOR(S) : Theodore S. Rappaport, et al.

It is certified that error appears in the above-indentified patent and that said Letters Patent is hereby corrected as shown below:

Cover Page, under Inventors, "Joseph G. Liberti" should be --Joseph C. Liberti--.

Col. 3, line 13, "genetic" should be --generic--.

Col. 5, line 45, "(TYL)" should be --(TTL)--.

Col. 7, line 42, "dam" should be --data--.

Col. 10, line 10, "RS232;port" should be --RS232 port--.

Col. 10, line 32, "RSST" should be --RSSI--.

Col. 10, line 64, "bottom of" should be --bottom line of--.

Col. 11, line 18, "carders" should be --carriers--.

Col. 13, line 25, "ignore" should be --ignored--.

Col. 3, line 44, "sweep a" should be --sweep through a--.

Col. 17, line 39, "dam" should be --data--.

UNITED STATES PATENT AND TRADEMARK OFFICE
CERTIFICATE OF CORRECTION

PATENT NO. : 5,451,839

DATED : September 19, 1995

INVENTOR(S) : Theodore S. Rappaport, et al.

It is certified that error appears in the above-indentified patent and that said Letters Patent is hereby corrected as shown below:

Col. 18, line 1, "analog-m-digital" should be --analog-to-digital--.

Signed and Sealed this

Twentieth Day of February, 1996

Attest:

BRUCE LEHMAN

*Attesting Officer*   *Commissioner of Patents and Trademarks*